United States Patent
Kloth

(10) Patent No.: US 7,286,534 B2
(45) Date of Patent: Oct. 23, 2007

(54) SRAM BASED CACHE FOR DRAM ROUTING TABLE LOOKUPS

(75) Inventor: Axel K. Kloth, Mountain View, CA (US)

(73) Assignee: Infineon Technologies North America Corporation, San Jose, CA (US)

( * ) Notice: Subject to any disclaimer, the term of this patent is extended or adjusted under 35 U.S.C. 154(b) by 931 days.

(21) Appl. No.: 10/052,793

(22) Filed: Nov. 2, 2001

(65) Prior Publication Data

US 2003/0086434 A1 May 8, 2003

(51) Int. Cl.
*H04L 12/28* (2006.01)
(52) U.S. Cl. ............ 370/392; 370/395.31; 370/395.32
(58) Field of Classification Search ................ 370/351, 370/392, 395.31, 395.32, 401, 389
See application file for complete search history.

(56) References Cited

U.S. PATENT DOCUMENTS

| | | | | |
|---|---|---|---|---|
| 5,528,592 A | | 6/1996 | Schibler et al. ............ 370/60.1 |
| 5,588,130 A | * | 12/1996 | Fujishima et al. .......... 711/118 |
| 5,875,117 A | * | 2/1999 | Jones et al. .................... 716/14 |
| 5,914,956 A | | 6/1999 | Williams ..................... 370/395 |
| 6,078,532 A | * | 6/2000 | Rivers et al. ................ 365/194 |
| 6,154,746 A | * | 11/2000 | Berchtold et al. ........... 707/100 |
| 6,404,752 B1 | * | 6/2002 | Allen et al. .................. 370/335 |
| 6,691,206 B1 | * | 2/2004 | Rubinstein ................... 711/105 |
| 6,985,483 B2 | * | 1/2006 | Mehrotra et al. ........... 370/389 |

OTHER PUBLICATIONS

Gupta et al, Routing Lookups in Hardware at Memory Access Speeds, IEEE, pp. 1240-1247, 1998.*
Chiueh et al, High-Performance IP Routing Table Lookup Using CPU Caching, IEEE, pp. 1421-1428, 1999.*

* cited by examiner

Primary Examiner—Frank Duong
(74) Attorney, Agent, or Firm—Fish & Richardson P.C.

(57) ABSTRACT

A router (101) includes one or more input ports (104) and one or more output ports (112). The router (101) includes a lookup table (105) to determine routing of the incoming packets or cells. The lookup table is implemented in dynamic random access memory (DRAM) with a portion implemented as static random access memory (SRAM) (202, 204). The SRAM (204) is used to store a first search level of destination addresses. Once the first search level in SRAM (204) has been exhausted, the search moves to the DRAM portion (202).

12 Claims, 3 Drawing Sheets

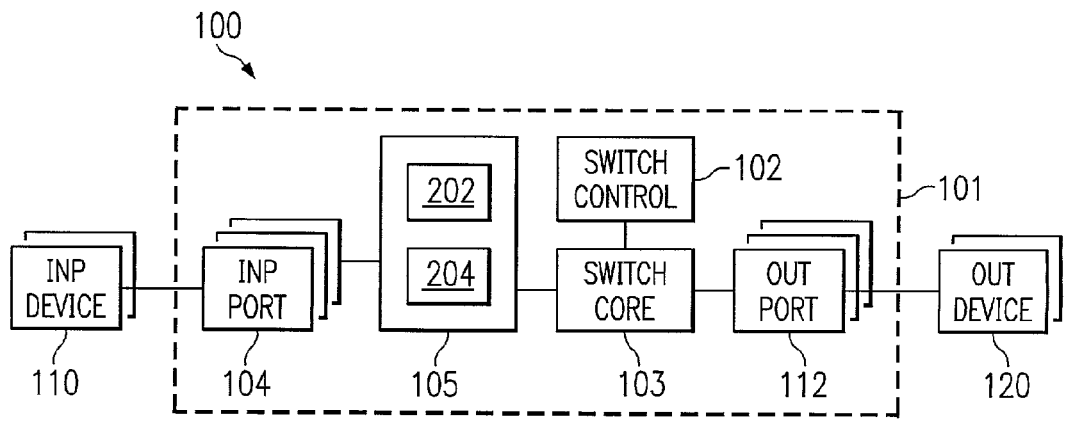
FIG. 1
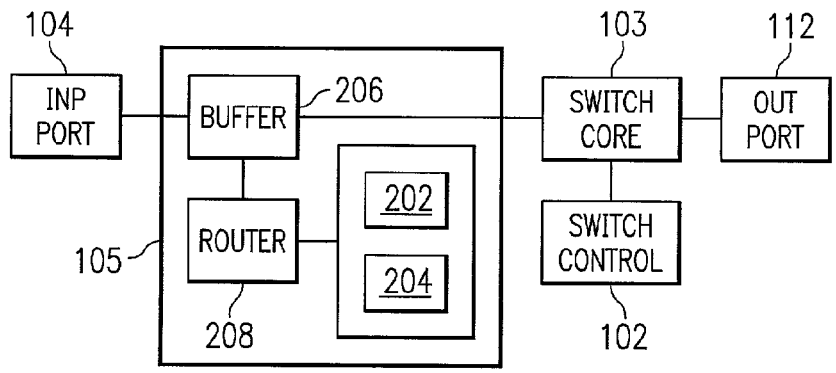
FIG. 2
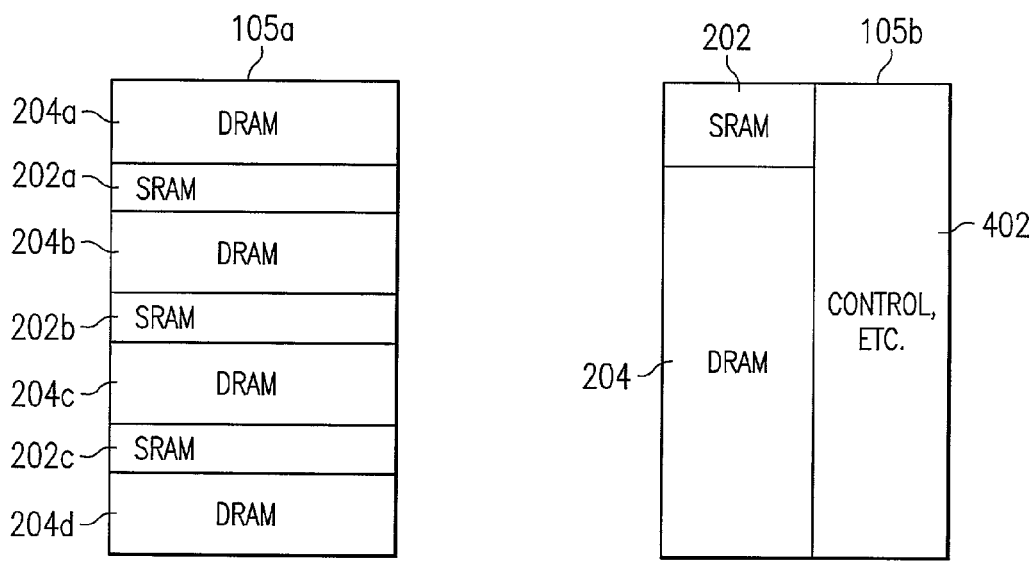
FIG. 3
FIG. 4

SRAM BASED CACHE FOR DRAM ROUTING TABLE LOOKUPS

BACKGROUND OF THE INVENTION

1. Field of the Invention

The present invention relates to data and telecommunications systems and, in particular, to an improved router for a data and telecommunications system.

2. Description of the Related Art

Data and telecommunications routers accept packets or cells of voice, data, or video information that need to be routed to a next destination, such as another router or switch, in order to hop through a network. Routers accept the packets, strip off any relevant information that may be present in a header (e.g., destination information), and send the packet or cell to an output port and a next destination.

To select the appropriate output port, routers use lookup tables stored in a specialized memory in the router. The lookup tables contain mapped entries of destination addresses to the output ports of the router. Once the destination address is stripped from the header of the packet, it is used as an entry point in the lookup table to lookup the actual output port of the router and another field describing the action to be taken for the associated packet.

Since packets come into the router in random fashion, there is generally no correlation between the destination address of one packet and the destination address of another. As such, the destination address may be randomly stored in the routing table. As such, a relatively time consuming search may need to be taken in order to find the destination output port. A loss of packets or cells can occur due to this latency delay.

Router tables may be stored in DRAM (dynamic random access memory) within the router. While use of DRAM is advantageous in terms of cost, the DRAM may have a relatively large latency. This latency can result, for example, from asserting a row address strobe (RAS) and a delayed column address strobe (CAS) signal for the initial line and then subsequent CAS signals. The first RAS/CAS cycle can require about 50 ns and about 7 or 8 ns for subsequent CAS signals. At a 50 ns cycle time, even if only twenty accesses are required, a total delay of 1 microsecond will result, thus limiting the throughput of the router to 1 M lookups per second. Such a latency delay is insufficient to support, for example a Gigabit Ethernet port. Further, increasing the bandwidth of a DRAM during a burst access does not solve the problem, because the lack of correlation between destination addresses means, typically, there is no memory locality.

As such, there is a need for an improved router having an improved routing lookup table.

SUMMARY OF THE INVENTION

These and other drawbacks in the prior art are overcome in large part by a system and method according to embodiments of the present invention. A router according to an embodiment of the present invention includes one or more input ports and one or more output ports. A switch core includes a lookup table according to embodiments of the present invention to determine routing of the incoming packets or cells. The lookup table is implemented in dynamic random access memory (DRAM) with a portion implemented as static random access memory (SRAM). The SRAM is used to store a first search level of destination addresses. Once the first search level in SRAM has been exhausted, the search moves to the DRAM portion.

A router table according to an embodiment of the invention is implemented using a binary lookup table format. A first predetermined number of levels of the router table are maintained in static random access memory. A remainder of the router table is stored in dynamic random access memory. When a packet enters the router, the destination address in the header is stripped off and used to key a search in the SRAM. After the first number of levels in the SRAM are searched, the remainder of the search occurs of the DRAM, if necessary.

A method according to an embodiment of the invention includes receiving one or more data packets and reading a header for a destination address. A search in a lookup table begins with a search in an SRAM portion of the lookup table and concludes, if necessary, with a search in a DRAM portion of the lookup table.

BRIEF DESCRIPTION OF THE DRAWINGS

A better understanding of the invention is obtained when the following detailed description is considered in conjunction with the following drawings in which:

FIG. 1 is a block diagram of a data and telecommunications system according to an embodiment of the present invention;

FIG. 2 illustrates in greater detail a routing lookup system according to an embodiment of the present invention;

FIG. 3 illustrates an exemplary RAM in accordance with an embodiment of the present invention;

FIG. 4 illustrates an exemplary RAM in accordance with an embodiment of the present invention;

DETAILED DESCRIPTION OF THE INVENTION

Figure 5:
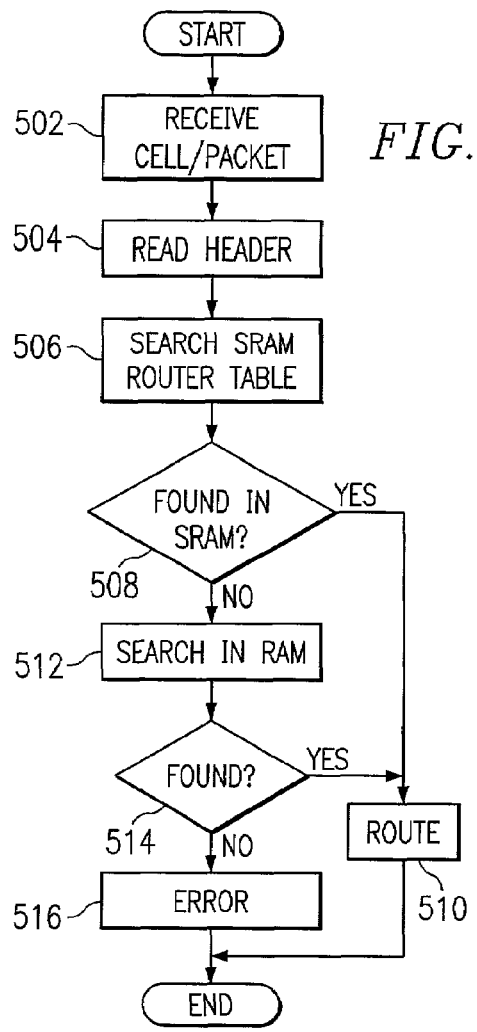
FIG. 5 is a flowchart illustrating a method according to an embodiment of the present invention.

Turning now to the drawings and, with particular attention to FIG. 1, a block diagram illustrating a data and telecommunications system according to an implementation of the invention is shown and identified by the reference numeral 100. The system 100 includes a data and telecommunications router 101. The data and telecommunications switch 101 receives packets or cells from one or more input devices 110 and delivers them to one or more input output devices 120. The data and telecommunications switch 101 may be embodied as an ATM (asynchronous transfer mode) or any other type of data and telecommunications switch that acts on data, voice or video cells or packets which include identifying headers indicating routing information. Generic data and telecommunications routers include those available from Siemens Corporation.

As shown, the data and telecommunications switch or router 101 includes one or more input ports 104, one or more output ports 112, a switch control 102, a switch core 103, and a router table 105 according to the present invention. Each input port 104 connects to one or more of the input devices 110. The output ports 112 interface to the output devices 120. The data and telecommunications switch 101 uses information from the cell header to determine to which of the output devices 120 the data should be sent. In particular, the switch core 103 reads the information in the header to determine a search in the router table 105 to determine where the packet is to be routed. According to embodiments of the present invention, the router table system 105 is implemented in DRAM 202 and SRAM 204 cache so as to improve lookup times. The router table 105 may be implemented as part of a CPU (central processing unit) and typically not, e.g., as content addressable memory (CAM).

More particularly, FIG. 2 is a block diagram illustrating in greater detail the lookup system of FIG. 1. As shown, the system 105 includes a buffer 206 for receiving incoming data packets from the input port 104, and a routing controller 208 for routing the packets to the appropriate output port(s) 112. Also included is a lookup table including DRAM cache 204 and SRAM cache 202 according to embodiments of the present invention. In operation, data packets are received from the input port(s) into the buffer 206. Their headers, which may be of a known format, are then read and by the routing controller 208. The routing controller 208 accesses the lookup table to determine where the packets are to be routed. The SRAM 202 is used to store a first search level of destination addresses. Once the first search level in SRAM 202 has been exhausted, the search moves to the DRAM portion 204. Once the search is completed, the packets are then routed appropriately.

FIG. 3 and FIG. 4 illustrate exemplary random access memory configurations that may be suitable for use as lookup tables in accordance with embodiments of the present invention. The RAM of FIG. 3 includes SRAM portions 202a, 202b, 202c interleaved with larger DRAM portions 204a, 204b, 204c, 204d. It is noted that this configuration is exemplary only. More or fewer SRAM and DRAM segments may be provided. As will be explained in greater detail below, the configuration of FIG. 3 may be especially suitable for use in conducting an interval bisection search.

The configuration of FIG. 4 includes an SRAM portion 202 and a DRAM portion 204. In addition, various control circuitry 402 may be provided. Again, this configuration is exemplary only. More SRAM and DRAM segments may be provided.

A method in accordance with embodiments of the present invention is illustrated with reference to the flowchart of FIG. 5. In particular, the flowchart of FIG. 5 illustrates an exemplary search of the router table in accordance with an embodiment of the present invention. In a step 502, a cell or packet is received from an input port 104 (FIG. 1). In a step 504, the packet or cell's header is read (for example, by router 208 (FIG. 2) while the packet is held in buffer 206). In step 506, the router table itself is accessed and, in particular, a first level of search is conducted in the SRAM portion 202. If the address is found in the SRAM 202, as determined in step 508, then the packet or cell is routed to the corresponding destination output port. Otherwise, in step 512, the search continues in the DRAM portion 204. If found in the DRAM portion 204, the cell or packet is routed to the appropriate destination output port. Otherwise, in step 516, an error signal may be returned.

Figure 6A:
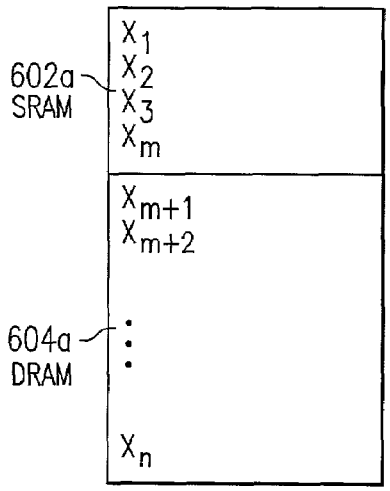
FIG. 6A and FIG. 6B illustrate lookup table configurations for embodiments of the present invention.
Figure 6B:
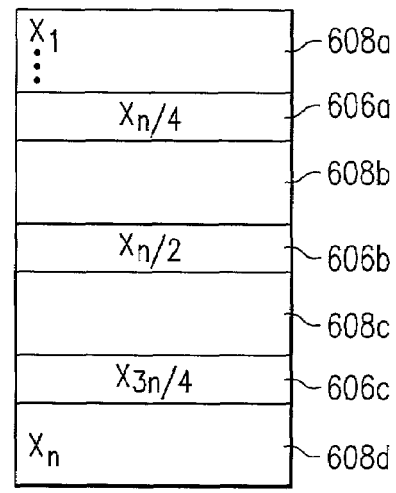

As noted above, a portion of the lookup table may be implemented in fast SRAM and another portion in slower, but less expensive DRAM. FIGS. 6A-6B illustrate various configurations by which the division may be made, depending on the search algorithm used. For example, FIG. 6A illustrates a configuration that may be particularly suited for use used if a simple, sequential search is made of the router table. As shown, the router table includes SRAM 602a and DRAM 604a. As is known, in a sequential search, a set of values to be searched in compared in a sequential order. For example, the entries shown in FIG. 6A have values from x1 through xn. Entries having values x1 through xm are stored in SRAM 602a. Entries having values xm+1 through xn are stored in DRAM 604a. To search, the router table, the system begins at entry x1 and searches sequentially up through entry xn (if necessary). Since the initial entries x1 through xm are stored in SRAM, their search will require less time than for the DRAM entries xm+1 through xn.

FIG. 6B illustrates a configuration similar to that of FIG. 3, which may be particularly suited, for example, for an interval bisection search. As is known, in an interval bisection search, the midpoint of an ordered list is found and the corresponding value examined to determine if the desired entry is higher or lower in the list. The half not containing the desired entry is "discarded," and the midpoint is reset at the point halfway between the original start point (or endpoint) and the original midpoint. This proceeds until the desired entry is found.

Thus, as shown in FIG. 6B, the router table includes SRAM 606a, 606b, 606c and DRAM 608a, 608b, 608c, 608d. The SRAM stores various initial levels of the search. If the desired entry is not found at the initial levels, then the DRAM is searched. For example, suppose the entries range from x1 through xn. The midpoint entry xm, where m=n/2 is stored in the SRAM 606a. Depending on whether the desired entry is in the top or bottom range, the search will then proceed to examine xn/4 or x3n/4. Thus, these values are stored in SRAM 606b, 606c. If another level of search is required, the searching will proceed through the DRAM. It is noted that, in practice, more levels of the search will be keyed in the SRAM. Use of the SRAM for the initial levels of the search considerably speeds up the search time. It is noted that, while variables are used in reference to the search terms, in certain embodiments, the search terms would be Internet Protocol (IP) addresses, of the form abc.xxx-.yyy.zzz.

Figure 7A:
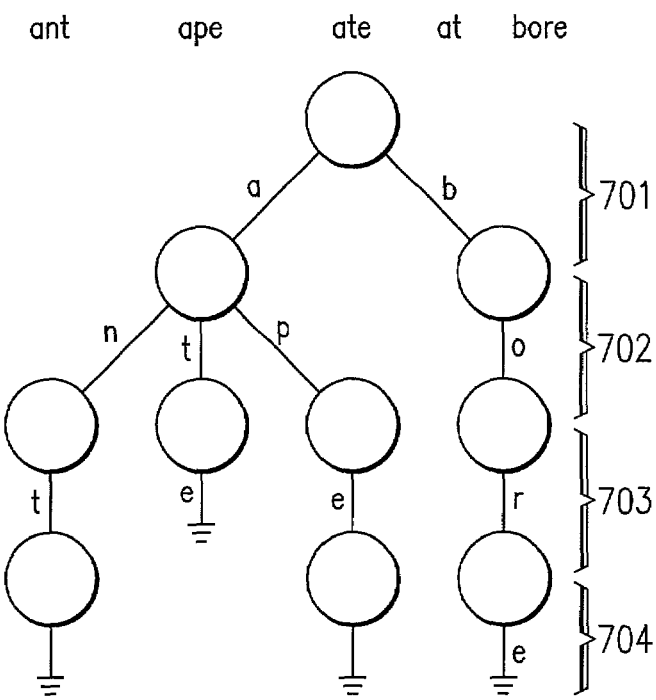
FIG. 7A and FIG. 7B illustrate data structures that may be used for the router table configurations of FIG. 6A and FIG. 6B.

Finally, either the configuration of FIG. 6A or FIG. 6B may be used if the search uses a binary search tree or interval bisection search. A "tree," for example, is a tree structure in which all strings sharing a common prefix descend from a common node. The elements of the string are recoverable by scanning from the root node to the leaf node that ends the string. For example, FIG. 7A illustrates an exemplary tree structure for the data "ant," "ape," "ate," "at," and "bore." (Again, in certain embodiments, the search terms would be IP addresses of the form abc.xxx.yyy.zzz.). The tree has four levels: 701, 702, 703, 704. In practice, of course, the routing addresses to be searched will have more than four elements and, hence, more than four levels. Thus, the figure is exemplary only. In embodiments of the invention, one or more of the initial layers of the search (e.g., 701, 702) may be stored in SRAM, while the remaining number (703, 704) are stored in DRAM.

Figure 7B:
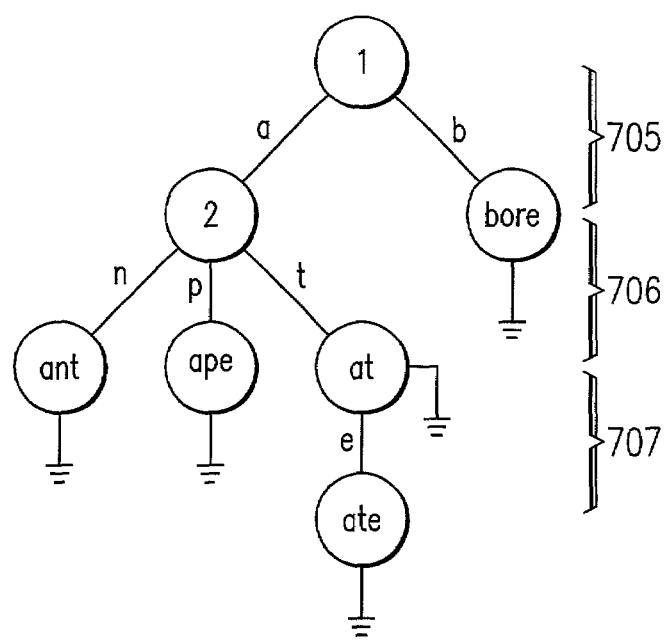

A more efficient structure, however, is the interval bisection tree. The tree data structure is a representation of a tree in which all nodes with more than one descendant are merged with their parents. For example, FIG. 7B illustrates a tree structure for the data set or keys already described above. In this case, the tree has three levels 705, 706, 707. Again, the top level or levels can be stored in SRAM, while the remaining levels are stored in DRAM. Finally, it is noted that the efficiency of a router according to the present invention increases as the number of tree branches increases—in DRAM the latency adds up; in SRAM, the latency would occur once.

It is noted that other search techniques may be employed. Thus, the figures are exemplary only. The invention described in the above detailed description is not intended to be limited to the specific form set forth herein, but is intended to cover such alternatives, modifications and equivalents as can reasonably be included within the spirit and scope of the appended claims.

What is claimed is:

1. A data and telecommunications switch, comprising:
one or more input ports for receiving data from one or more input devices;
a router adapted to route said data to one or more output devices, said router including a router table, the router table implemented as a DRAM and SRAM lookup table; and
a switch control unit for conducting a search of said SRAM and DRAM lookup table when said data are received,
wherein conducting a search of said SRAM and DRAM lookup table includes searching an SRAM portion of said SRAM and DRAM lookup table for routing information,
wherein if routing information is found in the SRAM portion, no search is performed in an DRAM portion of said SRAM and DRAM lookup table, and
wherein if no routing information is found in the SRAM portion, searching only the DRAM portion of said SRAM and DRAM lookup table.

2. The data and telecommunications switch in accordance with claim 1, said lookup table search comprising an interval bisection search, wherein a predetermined number of levels of said interval bisection search are stored in the SRAM portion, and a remaining number of levels are stored in the DRAM portion.

3. The data and telecommunications switch in accordance with claim 1, said lookup table search comprising a binary tree search, wherein a predetermined number of levels of said binary tree search are stored in the SRAM portion, and a remaining number of levels are stored in the DRAM portion.

4. A method, comprising:
receiving a data packet at an input port;
reading a header of said data packet for routing identification information;
using said routing identification information for accessing an SRAM portion of a routing table for routing information, and if no entry corresponding to said routing identification information is found in said SRAM portion, accessing only a DRAM portion of said routing table; and
routing said data packet using said routing information.

5. The method in accordance with claim 4, wherein said accessing comprises performing an interval bisection search, wherein a predetermined number of levels of said interval bisection search are stored in the SRAM portion, and a remaining number of levels are stored in the DRAM portion.

6. The method in accordance with claim 4, wherein said accessing comprises performing a binary tree search, wherein a predetermined number of levels of said binary tree search are stored in the SRAM portion, and a remaining number of levels are stored in the DRAM portion.

7. A method, comprising:
providing one or more input ports for receiving data from one or more input devices;
providing a router adapted to route said data to one or more output devices, said router including a router table, the router table implemented as a DRAM and SRAM lookup table; and
providing a switch control unit for conducting a search of said SRAM and DRAM lookup table when said data are received,
wherein conducting a search of said SRAM and DRAM lookup table includes searching an SRAM portion of said SRAM and DRAM lookup table for routing information,
wherein if routing information is found in the SRAM portion, no search is performed in an DRAM portion of said SRAM and DRAM lookup table,
wherein if no routing information is found in the SRAM portion, searching the DRAM portion of said SRAM and DRAM lookup table, and
wherein a predetermined number of levels of said search is stored in the SRAM portion, and a remaining number of levels of said search is stored in the DRAM portion.

8. The method in accordance with claim 7, said lookup table search includes an interval bisection search.

9. The method in accordance with claim 8, said lookup table search.

10. A router for a data and telecommunications system, comprising:
a routing controller for reading routing identification information from incoming data packets;
and a routing table for storing routing information, said routing table having a DRAM portion and an SRAM cache, wherein said routing controller uses said routing identification information to access said routing table for said routing information,
wherein a first portion of a search of said routing table is conducted in said SRAM cache and a second portion is conducted in said DRAM portion, and
wherein only said second portion of said search in said DRAM portion is conducted if no routing information is found in the SRAM portion.

11. The router in accordance with claim 10, wherein said search comprises an interval bisection search.

12. The router in accordance with claim 10, wherein said search comprises a binary tree search.

* * * * *